United States Patent
Frazier

(10) Patent No.: US 9,255,570 B2
(45) Date of Patent: Feb. 9, 2016

(54) METERED PUMP STAND

(75) Inventor: Eric D. Frazier, Marengo, IL (US)

(73) Assignee: UNITED LABORATORIES, INC., St. Charles, IL (US)

( * ) Notice: Subject to any disclaimer, the term of this patent is extended or adjusted under 35 U.S.C. 154(b) by 1043 days.

(21) Appl. No.: 13/297,126

(22) Filed: Nov. 15, 2011

(65) Prior Publication Data

US 2012/0183416 A1    Jul. 19, 2012

Related U.S. Application Data

(60) Provisional application No. 61/413,757, filed on Nov. 15, 2010.

(51) Int. Cl.
| | | |
|---|---|---|
| F04B 13/00 | (2006.01) |
| F16M 13/00 | (2006.01) |
| F04B 23/02 | (2006.01) |
| F04B 53/22 | (2006.01) |
| F16M 11/00 | (2006.01) |

(52) U.S. Cl.
CPC ............. F04B 13/00 (2013.01); F04B 23/025 (2013.01); F04B 53/22 (2013.01); F16M 13/00 (2013.01); F16M 11/00 (2013.01)

(58) Field of Classification Search
CPC ........ F04B 13/00; F04B 53/22; F04B 23/025; F04B 23/026; B05B 9/0403; B05B 9/007; B05B 9/043; F04D 29/60; F16M 11/00; F16M 2200/08; F16M 13/00
USPC ............. 417/360, 234, 363, 423.15; 137/343; 222/173; 210/205, 206, 249, 250; 248/127, 146, 152, 176.1, 158; D8/349, 356; D15/7
See application file for complete search history.

(56) References Cited

U.S. PATENT DOCUMENTS 2,763,288 A * 9/1956 Tharp ...................... 137/565.12
4,003,504 A * 1/1977 Johnson et al. ............... 222/626
(Continued)

FOREIGN PATENT DOCUMENTS

| DE | 2658021 A1 * | 7/1978 |
| DE | 19511885 A1 * | 10/1996 |
| JP | 2000203615 A * | 7/2000 |

OTHER PUBLICATIONS

A757 UltraDose Automatic Dispensing Pump Model #1160. Believed to be publically available as early as Nov. 15, 2011.
(Continued)

*Primary Examiner* — Devon Kramer
*Assistant Examiner* — Nathan Zollinger
(74) *Attorney, Agent, or Firm* — Marshall, Gerstein & Borun LLP

(57) ABSTRACT

A metered pump system periodically pumps measured amounts of chemical or biological material into a septic or sewage system. The metered pump system includes a metered pump stand having a main panel with first and second sides, a top edge, a bottom edge, and a pair of side edges. A pair of feet extends from the first side of the main panel near the bottom edge. An upper flange extends from the second side of the main panel near the top edge. A metered pump may be attached to the first side of the main panel. The upper flange of the metered pump stand is disposed above a portion of a material container that supplies chemical or biological material to the metered pump. The disclosed metered pump system is customizable by interchanging components while using the same metered pump stand.

14 Claims, 5 Drawing Sheets

(56) References Cited

U.S. PATENT DOCUMENTS

| | | | |
|---|---|---|---|
| 4,432,470 A * | 2/1984 | Sopha | 222/135 |
| 4,600,129 A * | 7/1986 | Kondo | 222/175 |
| D306,477 S * | 3/1990 | Weiss | D23/225 |
| D357,728 S * | 4/1995 | Carano | D23/200 |
| 5,810,213 A * | 9/1998 | Flores et al. | 222/610 |
| 7,735,685 B2 * | 6/2010 | Bertram | 222/135 |
| 8,177,144 B2 * | 5/2012 | Rossner et al. | 239/332 |
| 2008/0292481 A1 * | 11/2008 | Castagnetta et al. | 417/437 |

OTHER PUBLICATIONS

United 757 Material Safety Data Sheet, United Laboratories, Jul. 22, 2009.

* cited by examiner

METERED PUMP STAND

RELATED APPLICATIONS

This application is a non-provisional application that claims priority benefit of U.S. Provisional Patent Application No. 61/413,757, filed Nov. 15, 2010, the entirety of which is hereby incorporated by reference herein.

BACKGROUND

1. Field of the Disclosure

The invention generally relates to metered pump stands for metered pumps that periodically pump measured amounts of chemical or biological material into septic or sewage systems.

2. Related Technology

Certain systems require periodic additions of chemical or biological material to keep the systems running smoothly. For example, boiler systems, cooling towers, septic tanks, or other sewage systems, may require periodic additions of chemical or biological material to break down sewage in the system, or to clean fouling substances from pipes, so that the system continues to run smoothly. Similarly, plumbing systems, in particular drains in plumbing systems, may require periodic additions of chemical or biological materials to clear drains of blockages or build-ups.

Pumps and pumping devices have been developed that periodically meter a set amount of chemical or biological material into drains or sumps of septic or sewage systems. These pumps are connected to a supply of chemical or biological material. The pumps generally include an internal timer, a power source (e.g., battery or A/C power from an outlet), a processor, and an input device (such as a keyboard, a touchscreen, an input button, a data port, etc.). A user may program the pump with a material addition schedule by which the pump periodically or regularly adds chemical or biological material to the septic or sewage system. One example of such a pumping system is the United 757 NEEM-BAC Gelled Drain Treatment System produced by United Laboratories Inc. The United 757 NEEM-BAC system injects several bacterial strains and Neem oil in a gelled formulation that provides the bacteria sufficient surface contact time to implant into build-up found in drains. The bacteria work to eliminate the build-up by degrading organic solids, proteins, starch, cellulose and grease.

Known pumps or pumping devices are usually permanently mounted to a wall or other structure in a conventional way, such as by using fasteners, wall anchors, etc. An input of the pump is then connected to a source of chemical or biological material and an output of the pump is connected to a drain, sump, or pipe in a septic or sewage system. Because the pump is permanently mounted in a specific location, the source of chemical or biological material must be located in proximity to the pump. Known sources of chemical or biological material are usually stored in bulk containers, such as deltangular containers, which come in many sizes, for example six gallon sizes.

Permanently mounted pumps are not easy to relocate. The permanently mounted pump must first be removed from the wall or other support. Next, new holes must be drilled in the new location. Additional mounting hardware may also be required.

Recently, pumps have been mounted directly to the bulk containers of the chemical or biological material to save space. Pumps mounted to the bulk container often result in a pump/container configuration that is large or awkwardly shaped. In other words, the container mounted pumps often do not fit well into locations near drains or sumps, which are often spatially limited.

SUMMARY OF THE DISCLOSURE

A metered pump system includes a metered pump stand having a main panel with first and second sides, a top edge, a bottom edge, and a pair of side edges. A pair of feet extends from the first side of the main panel near the bottom edge. An upper flange extends from the second side of the main panel near the top edge. A metered pump may be attached to the first side of the main panel. A material container for supplying chemical or biological material to the metered pump may be located proximate the second surface of the main panel. The disclosed metered pump system is customizable by interchanging components while using the same metered pump stand.

BRIEF DESCRIPTION OF THE DRAWINGS

Objects, features, and advantages of the present invention will become apparent upon reading the following description in conjunction with the drawing figures, in which.

DETAILED DESCRIPTION

Figure 1:
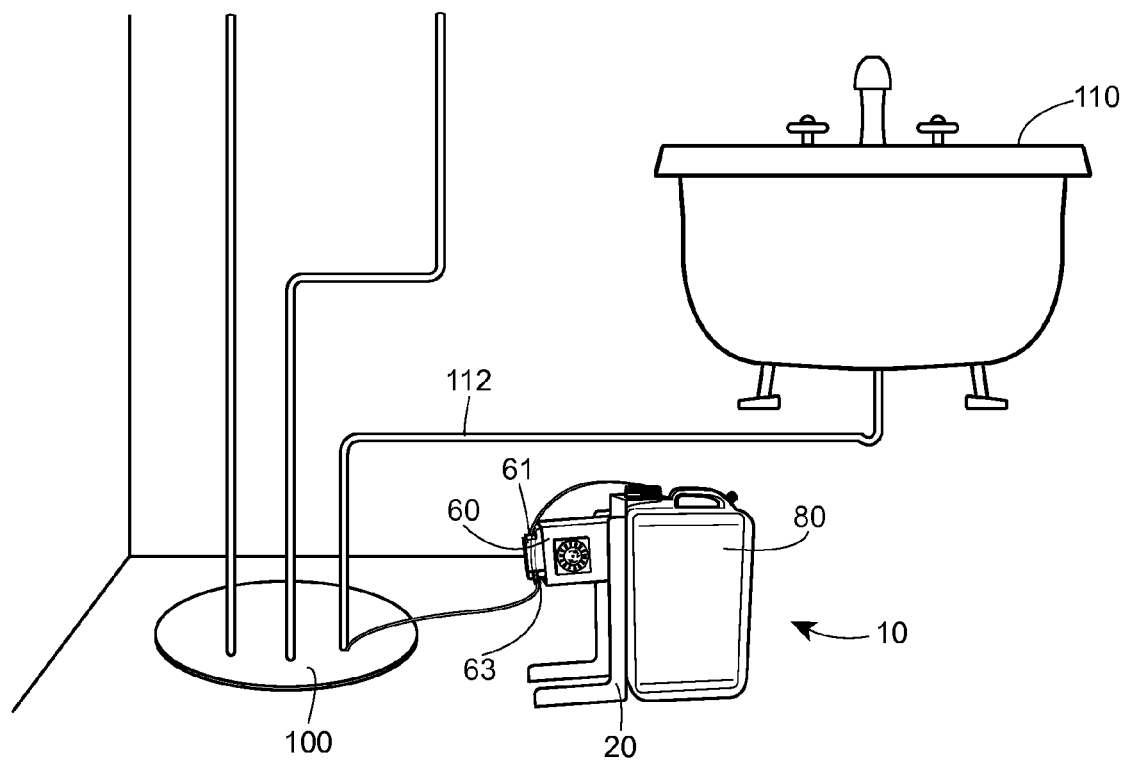
FIG. 1 is a perspective view of a metered pump system installed near a typical septic system sump, the metered pump system including a metered pump stand, a metered pump, and a material container.

FIG. 1 illustrates a metered pump system 10 connected to a sump 100 of a septic system. The metered pump system 10 includes a metered pump stand 20, a metered pump 60, and a material container 80. An input 61 of the metered pump 60 is connected to a chemical or biological material within the material container 80 while an output 63 of the metered pump 60 is connected to the sump 100. The metered pump 60 periodically pumps a measured amount of chemical or biological material from the material container 80 into the sump 100. An empty container 80 may be quickly and easily replaced with a full container 80. Other plumbing fixtures, such as a sink 110, for example, may be located in proximity to the sump 100 and connected to the sump 100 via one or more drain pipes 112. The metered pump system 10 advantageously fits underneath the sink 110 to save space. Moreover, the metered pump system 10 is easily movable and may be repositioned based upon special considerations or other factors. Furthermore, the metered pump system 10 may be connected to the drain pipe 112 in addition to the septic sump 100, if desired.

Figure 2:
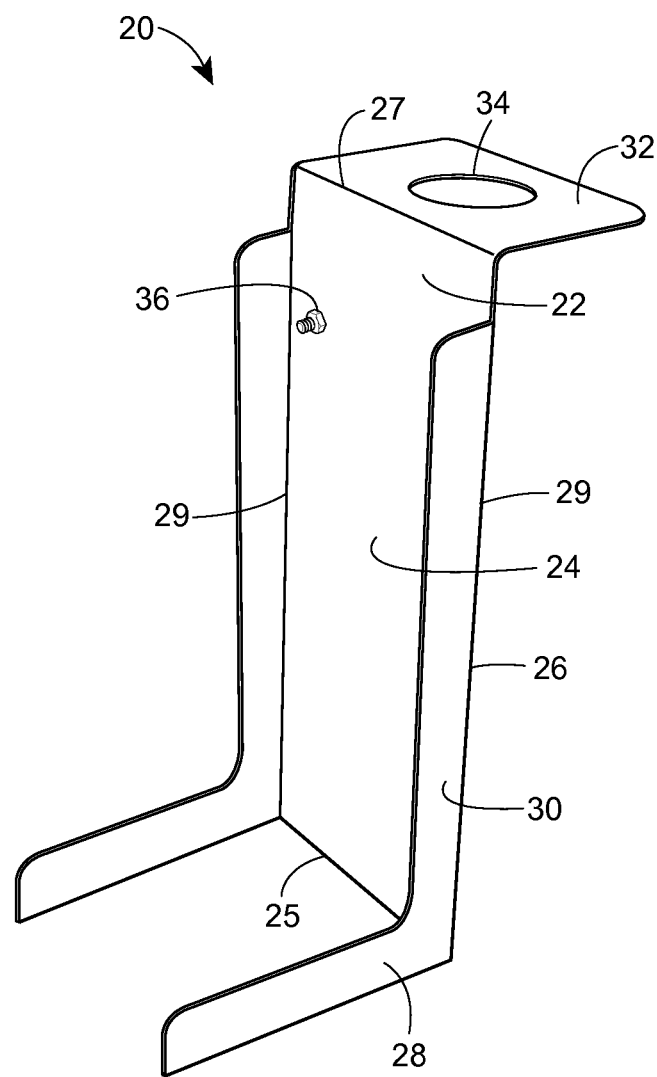
FIG. 2 is a perspective view of the metered pump stand of FIG. 1.
Figures 3, 4:
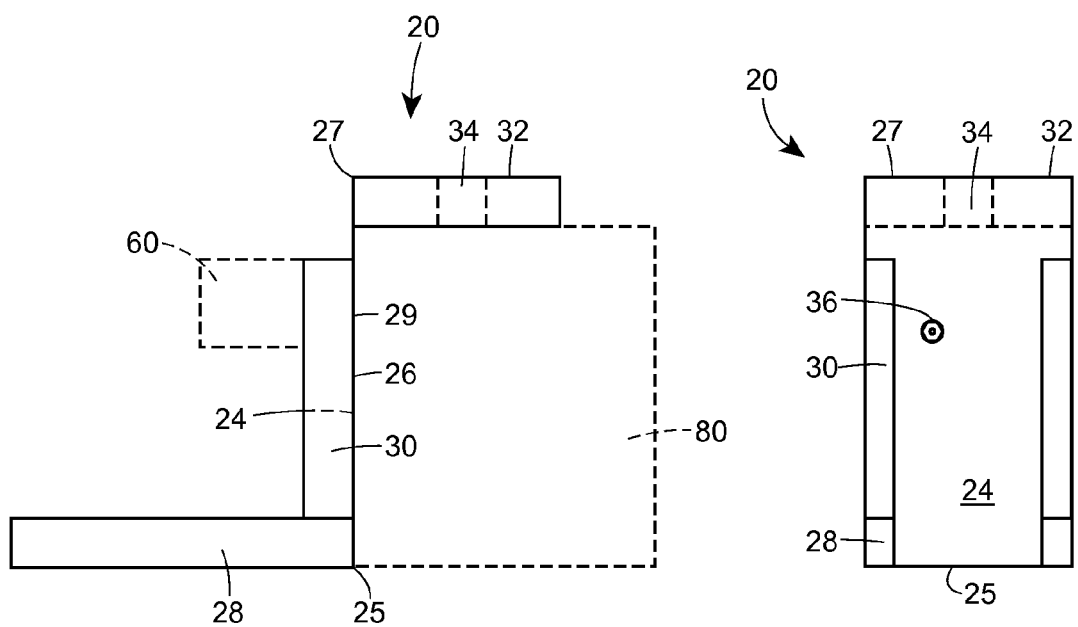
FIG. 3 is a side elevational view of the metered pump stand of FIG. 1.
FIG. 4 is a front view of the metered pump stand of FIG. 1.

FIGS. 2-4 illustrate the metered pump stand 20 in more detail. The metered pump stand 20 includes a main panel 22 having a front or first surface 24 and a back or second surface 26 opposite the first surface 24. The main panel 22 may also includes a bottom edge 25, a top edge 27, and a pair of side edges 29. In the embodiment of FIGS. 2-4, the main panel 22 takes on a roughly rectangular shape. However, other embodiments may have other shapes, such as, for example, square, circular, triangular, oval, polygonal, etc., based on spatial considerations or other factors.

The metered pump stand 20 has a pair of feet 28 extending outwardly from the first surface 24, near the bottom edge 25. Other embodiments may have more or less than two feet. For example, other embodiments may have one, three, four, five, or more feet. The feet 28 in this embodiment are generally rectangular in shape having a length that is greater than a height. However, other embodiments of the metered pump stand 20 may have feet 28 with other shapes, or other relative dimensions. For example, other embodiments may have feet 28 that have a height that is greater than a length, or the feet 28 may be triangular in shape. Regardless of size or shape, the feet 28 stabilize the metered pump stand and counter any moment created by the weight of the metered pump 60 when the metered pump 60 is mounted on the first surface 24, as illustrated in FIG. 1.

A pair of guide rails 30 extends outwardly from the first surface 24 along the side edges 29. The guide rails 30 may be integral with the feet 28, as in the embodiment illustrated in FIGS. 2-4. However, other embodiments may include guide rails 30 that are separated from the feet 28. Still other embodiments may not have guide rails 30. Regardless, the guide rails 30 of the embodiment illustrated in FIGS. 2-4 help position the metered pump 60 on the first surface 24 by guiding the metered pump 60 into a correct mounting position. Additionally, the guide rails 30 may at least partially protect the metered pump 60 from impact damage, especially when moving the metered pump stand 20, or when changing the material container 80. In the embodiment of FIGS. 2-4, the guide rails 30 do not extend completely to the upper edge 27 of the main panel 22. However, other embodiments may include guide rails 30 that extend completely to the upper edge 27, or the guide rails 30 may terminate at any point between the feet 28 and the upper edge 27.

An upper flange 32 extends outwardly from the second surface 26 near the upper edge 27 of the main panel 22. The upper flange 32 may include an opening 34 that is sized to receive a spout or mouth 86 (see FIG. 6) of the material container 80. When the metered pump stand 20 is attached to a material container 80, the mouth 86 of the material container 80 extends through the opening 34 and the opening 34 stabilizes the metered pump stand 20 with respect to the material container 80 while allowing an input of the metered pump 60 to access material in the material container 80 through the mouth 86 of the material container 80. The moment created by the weight of the upper flange 32 when the metered pump stand 20 is standing freely is countered by the moment created by the feet 28. The feet 28 extend outwardly farther from the first surface 24 than the upper flange extends outwardly from the rear surface 26. In the embodiment of FIGS. 2-4, the feet 28 extend approximately twice as far from the first surface 24 as the upper flange 32 extends from the second surface 26. In other embodiments, a single foot may extend outwardly from the first surface 24 at the bottom edge 25 in a mirror image of the upper flange 32.

The first surface 24 also includes one or more mounting structures, such as a mounting pin 36. The mounting pin 36 may fit into a complementary recess in a rear side of the metered pump 60 when the metered pump 60 is mounted on the metered pump stand 20. Other mounting structures are possible in other embodiments of the metered pump stand 20. For example, other embodiments may use mounting shelves, mounting fasteners, mounting hooks, etc. However, the mounting structures should releasably secure the metered pump 60 to the first surface 24.

Figure 5:
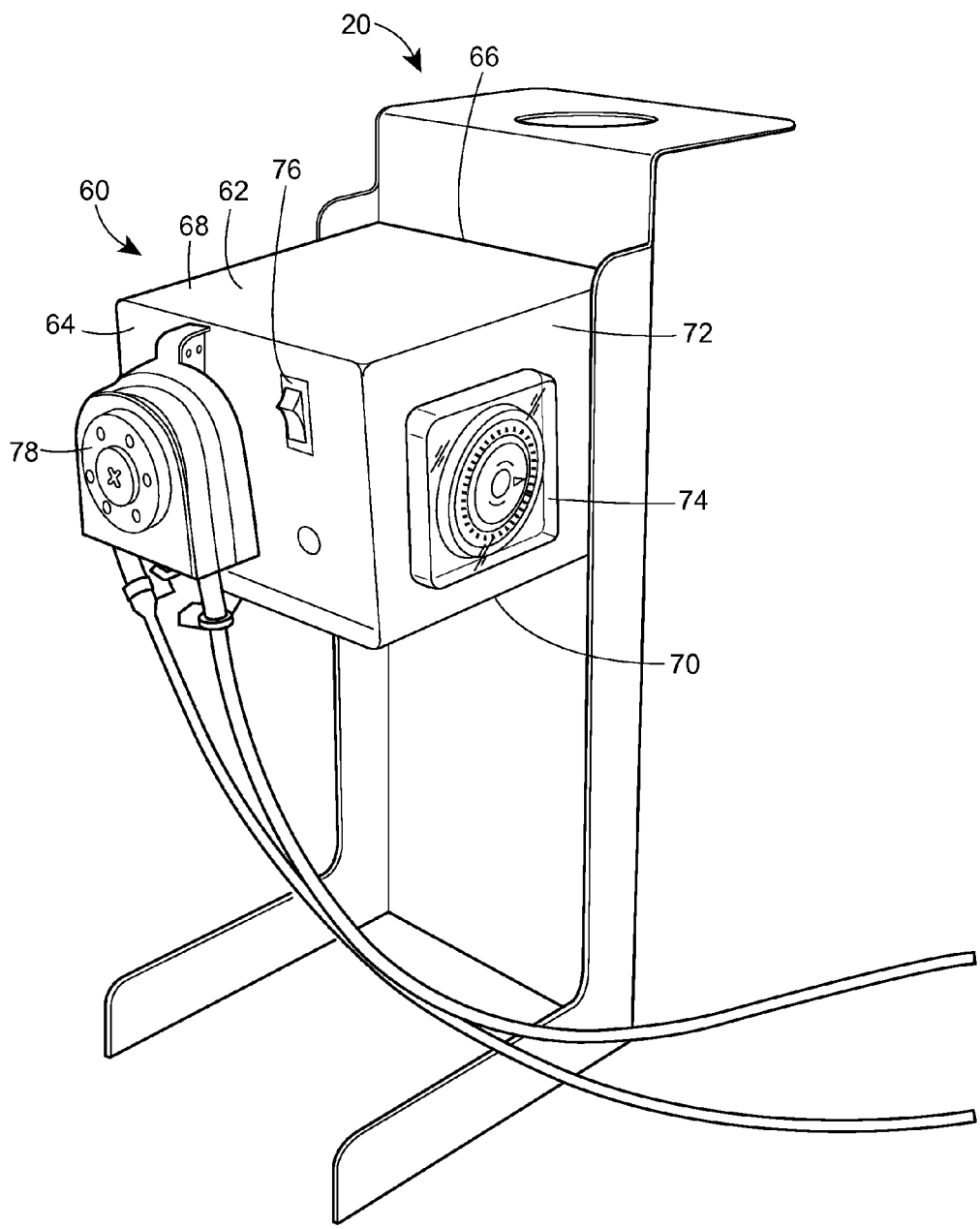
FIG. 5 is a perspective view of the metered pump stand of FIG. 1 with a metered pump attached to a front surface of the metered pump stand.

Turning now to FIG. 5, a metered pump 60 is illustrated attached to the metered pump stand 20. The metered pump 60 includes a pump body 62 having a front surface 64, a back surface 66, a top surface 68, a bottom surface 70, and two side surfaces 72. The pump body 62 in this embodiment takes on a cubic shape. Other embodiments may have pump bodies of different shapes. For example, other embodiments may have pump bodies 62 that are rectangular cubes, circular, oval, and irregular shapes.

The metered pump 60 also includes an input device, such as a timer 74, by which a user may program a specific pumping schedule. For example, a user may set the timer 74 to pump a metered amount of material into the septic system every two days. Other pumping schedules are possible depending on the needs of the particular system. The pump body 62 also includes a power switch 76 to turn the metered pump 60 on or off. A material input/output hose 78 is connected to a source of material in the material container 80 at one end, and the sump 100 or drain 112 at the other end. The metered pump 60 draws chemical or biological material in from the material container 80 through an input hose and pumps the chemical or biological material into the sump or drain through an output hose. The input and output hoses may be flexible hoses made of plastic or rubber, or the input and output hoses may be more rigid hoses made of PVC or metal, for example.

Figure 6:
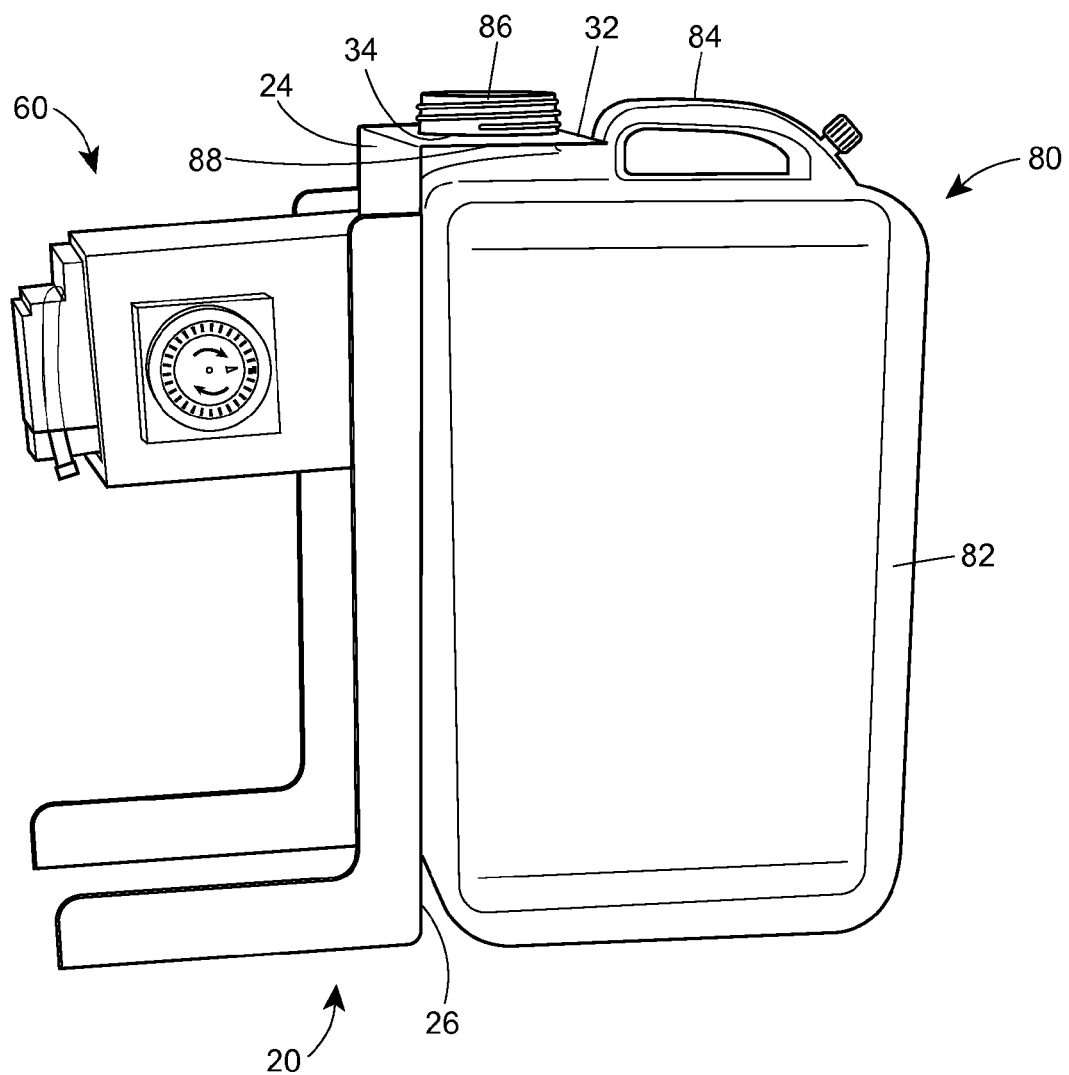
FIG. 6 is a perspective view of the metered pump stand of FIG. 5 including a container proximate a back surface of the metered pump stand.

FIG. 6 illustrates a metered pump system comprising a metered pump stand 20 with a metered pump 60 mounted on the first surface 24 and a material container 80 located proximate the second surface 26. The material container 80 includes a container body 82, a handle 84, and an opening or spout 86. The container body 28 may be generally cube-shaped in this embodiment. However, other shapes are possible in other embodiments. For example, other embodiments may have cylindrical, spherical, pyramid, cone, or parallelepiped shaped container bodies 82. Regardless, the upper flange 32 of the metered pump stand 20 may rest on top of a ledge 88 in the material container. The spout 86 of the material container may extend through the opening 34 in the upper flange 32 to further stabilize and support the metered pump stand 20. Although not illustrated in FIG. 6, a securing nut may be threadably engaged with the spout 86 to sandwich the flange 32 between the securing nut and the ledge 88 if desired.

The disclosed metered pump stands and systems advantageously provide greater spatial flexibility and portability over prior art metered pump systems. Moreover, the disclosed metered pump stands and systems may be easily customized to particular septic or sewer systems. For example, different metered pumps and/or material containers may be interchanged with one another to provide different capabilities while using a common metered pump stand.

Although certain metered pump stands and metered pump systems have been described herein in accordance with the teachings of the present disclosure, the scope of the appended claims is not limited thereto. On the contrary, the claims cover all embodiments of the teachings of this disclosure that fairly fall within the scope of permissible equivalents.

What is claimed is:
1. A metered pump system for periodically pumping measured amounts of chemical or biological material into a septic or sewage system, the metered pump system comprising:
   a metered pump stand including;
   a main panel having first and second sides, the main panel including a top edge, a bottom edge, and a pair of side edges;

a pair of feet extending from the first side of the main panel near the bottom edge;

a pair of guide rails extending from the first side proximate the side edges, the guide rails being integral with the feet and extending in the same direction as the feet; and an upper flange extending from the second side of the main panel near the top edge;

a metered pump attached to the first side of the main panel; and a material container for supplying chemical or biological material to the metered pump, the material container being located proximate the second side of the main panel, wherein the upper flange is disposed above a portion of the material container, the metered pump is connected to chemical or biological material in the material container through an input hose and the metered pump is connected to a sump of the septic or sewage system through an output hose, the metered pump pumping the chemical or biological material from the material container into the sump of the septic or sewage system.

2. The metered pump system of claim 1, wherein the upper flange includes an opening shaped to receive part of the material container.

3. The metered pump system of claim 2, wherein the material container includes a spout through which material in the material container may be accessed.

4. The metered pump system of claim 3, wherein the spout extends through the opening.

5. The metered pump system of claim 3, wherein the material container includes a ledge.

6. The metered pump system of claim 5, wherein the upper flange is disposed above the ledge.

7. The metered pump system of claim 1, wherein the first side includes a mounting structure for removably mounting the metered pump to the metered pump stand.

8. The metered pump system of claim 7, wherein the mounting structure fits into a complementary recess on a back surface of the metered pump.

9. The metered pump system of claim 7, wherein the mounting structure is a mounting pin.

10. The metered pump system of claim 1, wherein the feet extend outwardly from the first side at least twice as far as the upper flange extends outwardly from the second side.

11. The metered pump stand of claim 1, wherein the metered pump includes an input device.

12. A metered pump stand for a metered pump system, the metered pump stand comprising:

a main panel having a first side, a second side, a top edge, a bottom edge, and a pair of side edges;

a pair of feet extending from the first side proximate the bottom edge; and an upper flange extending from the second side proximate the top edge;

a pair of guide rails extending from the first side proximate the side edges, the guide rails being integral with the feet and extending in the same direction as the feet;

a metered pump attached to the first side; and a material container positioned proximate the second side, wherein the first side includes a mounting structure for removably mounting the metered pump to the first side and the upper flange includes an opening sized to receive a portion of the material container, and wherein the metered pump is connected to chemical or biological material in the material container through an input hose and the metered pump is connected to a sump of a septic system through an output hose, the metered pump pumping the chemical or biological material from the material container into the sump of the septic system.

13. The metered pump stand of claim 12, wherein the mounting structure is a mounting pin.

14. The metered pump stand of claim 13, wherein the mounting structure fits into a complementary recess in a back surface of the metered pump.

\* \* \* \* \*